Figure 1:
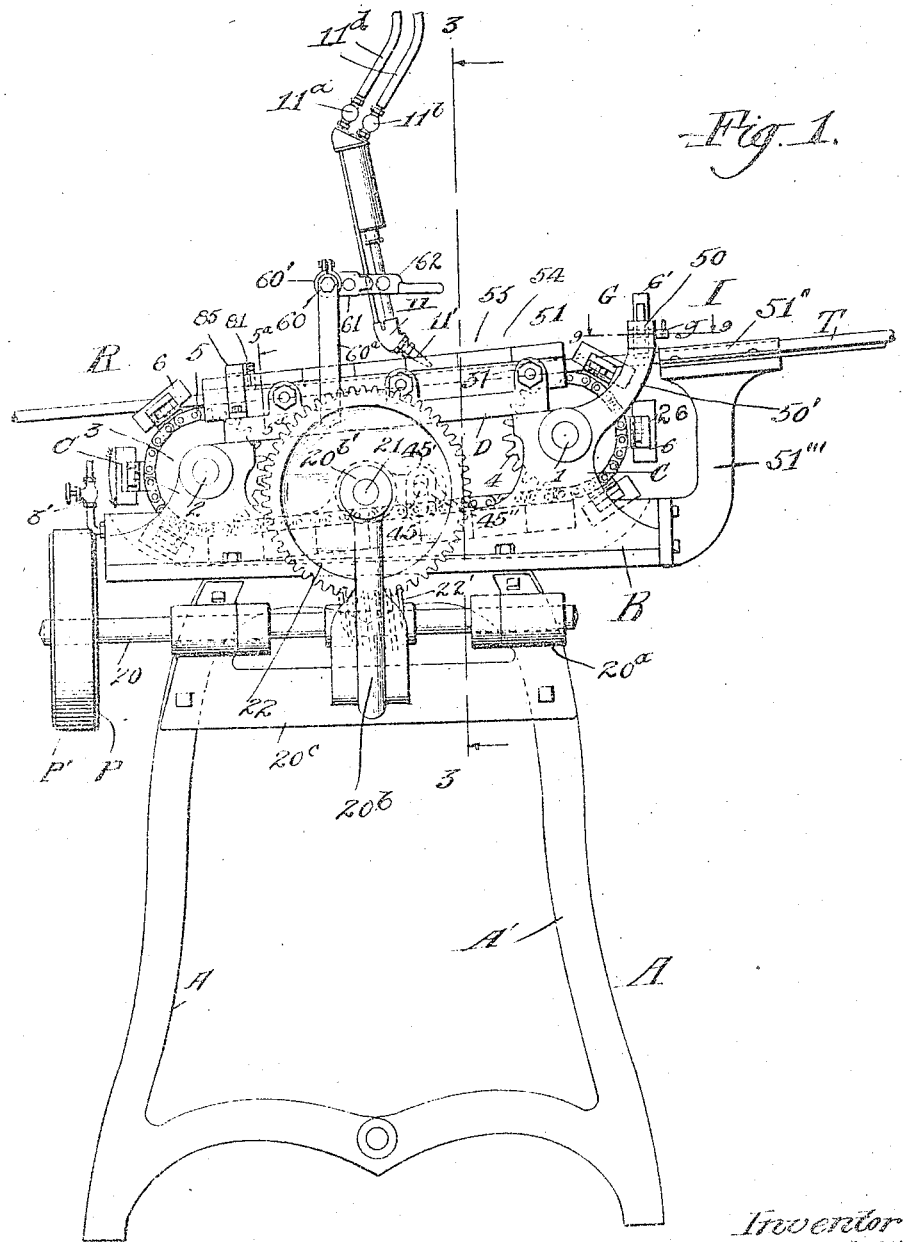

M. B. LLOYD.
TUBE WELDER.
APPLICATION FILED APR. 6, 1912.
1,124,755.
Patented Jan. 12, 1915.
6 SHEETS—SHEET 2.
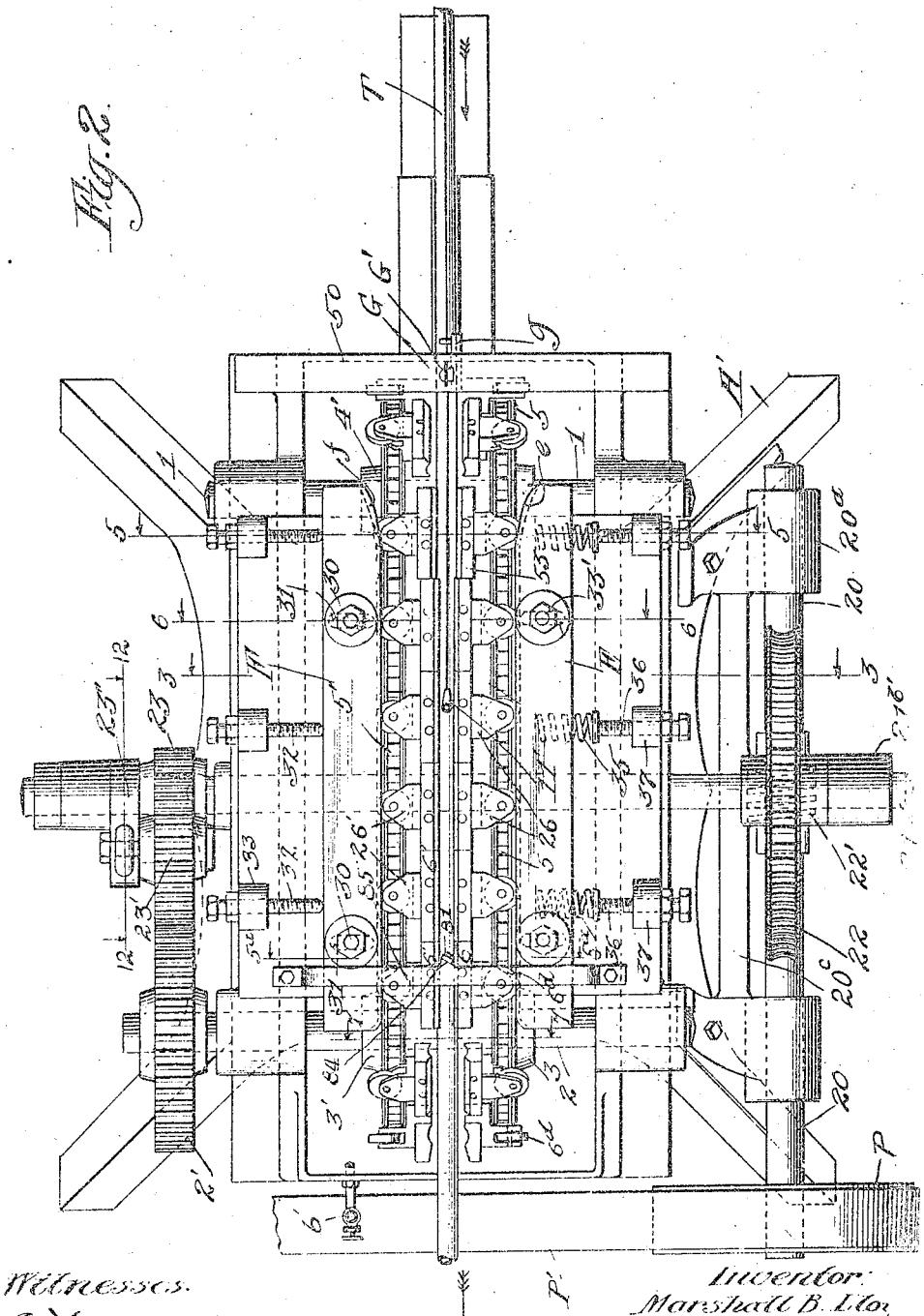
Fig. 2.
Witnesses.
Arthur W Nelson
Edgar F Beaubien
Inventor:
Marshall B. Lloyd
by 
Atty.

M. B. LLOYD.
TUBE WELDER.
APPLICATION FILED APR. 6, 1912.
1,124,755.
Patented Jan. 12, 1915.
6 SHEETS—SHEET 3.
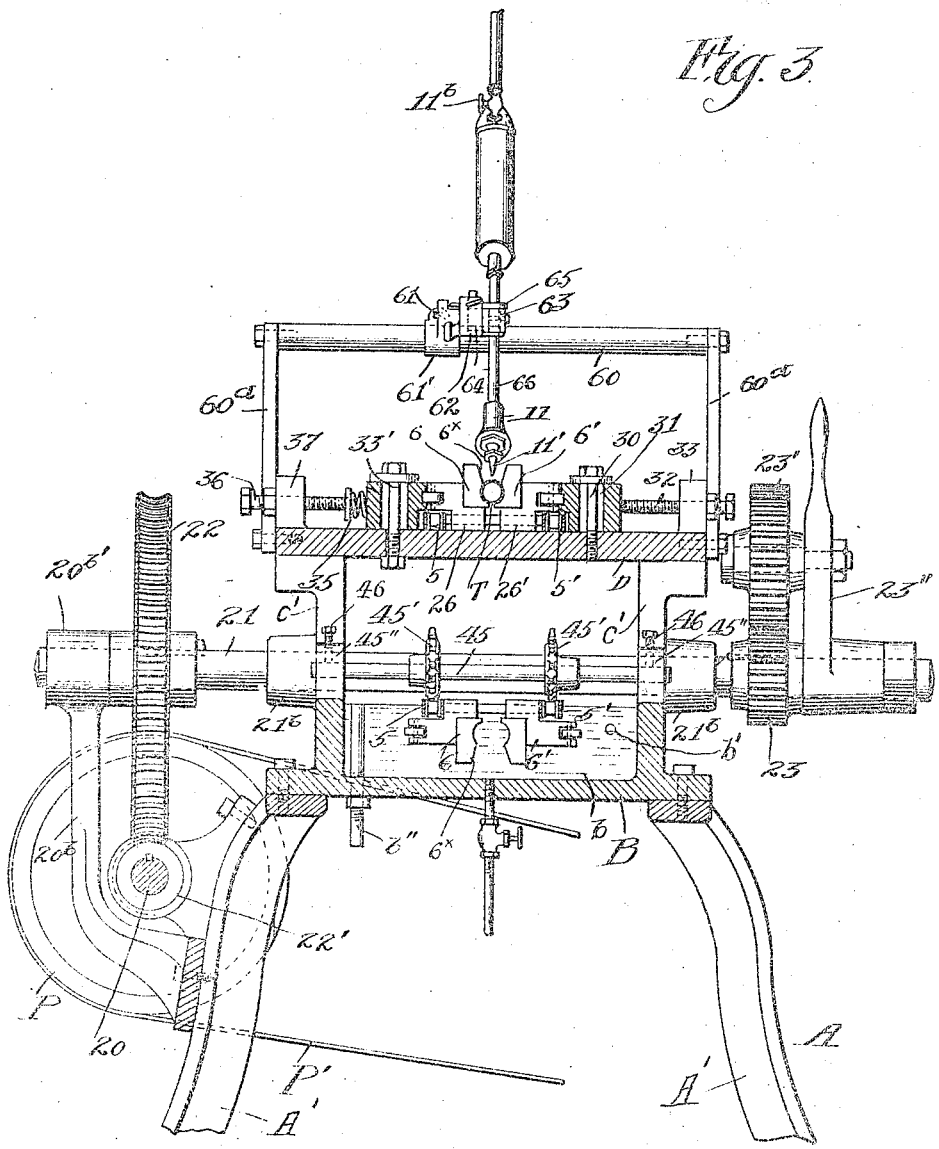
Fig. 3
Witnesses:
Arthur W. Nelson
Edgar F. Beaubien
Inventor:
Marshall B. Lloyd
by 

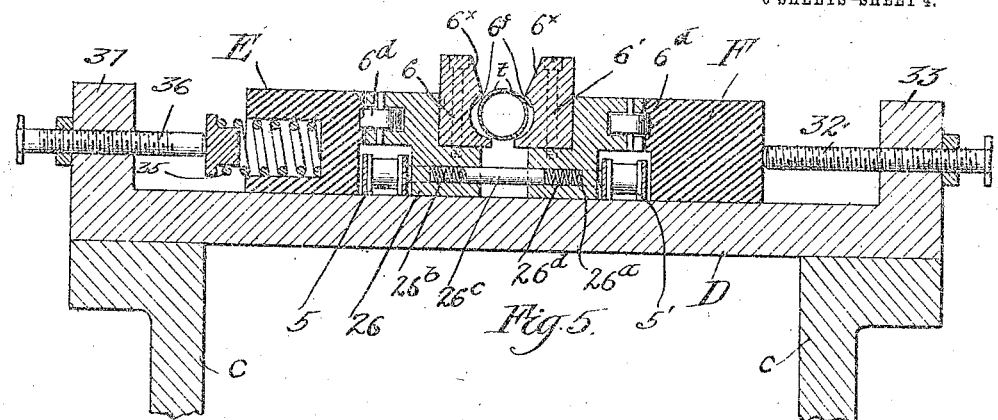

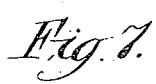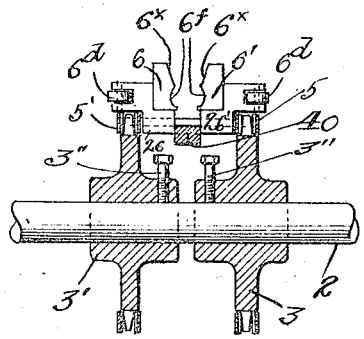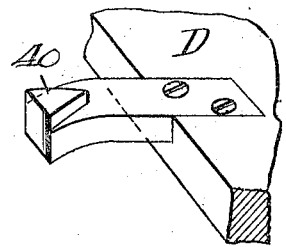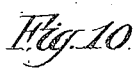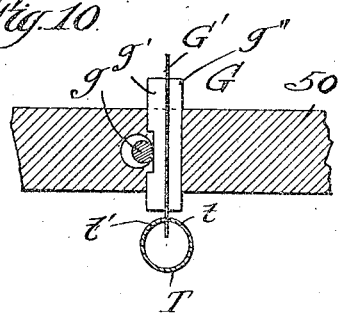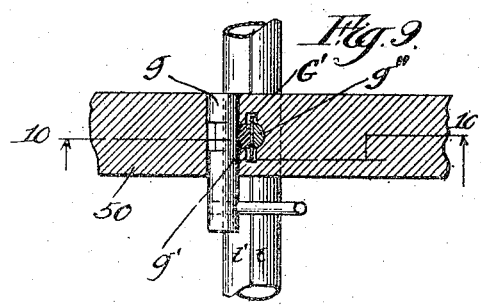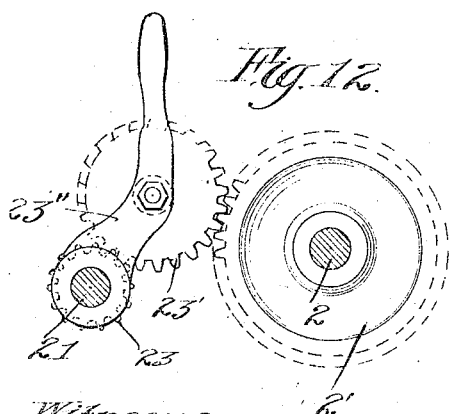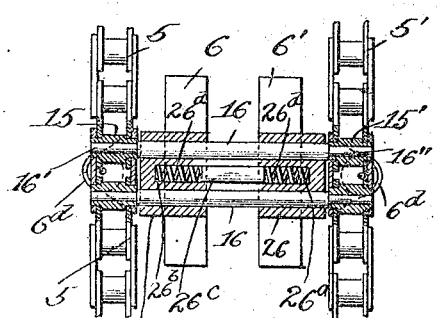

M. B. LLOYD.
TUBE WELDER.
APPLICATION FILED APR. 6, 1912.

1,124,755.

Patented Jan. 12, 1915.
6 SHEETS—SHEET 6.

Witnesses:
Arthur O Nelson
Edgar F Beaubien

Inventor:
Marshall B. Lloyd
by
Atty.

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

TUBE-WELDER.

1,124,755. Specification of Letters Patent. Patented Jan. 12, 1915.

Application filed April 6, 1912. Serial No. 689,092.

*To all whom it may concern:*

Be it known that I, MARSHALL BURNS LLOYD, a citizen of the United States, and a resident of Menominee, county of Menominee and State of Michigan, have invented a certain new, useful, and Improved Tube-Welder, of which the following is a full, true, clear, and exact description, such as will enable others skilled in the art to make and use the same.

My invention relates to improvements in machines for manufacturing metal tubing and has special reference to machines for welding the seams of pre-formed metal tubes.

This present invention is related to that which is shown and described in my prior application, Serial Number 638,203, filed July 12th, 1911.

The object of my invention is to provide a machine by which the seam of a metal tube may be welded without recourse to the usual step of preliminarily heating the whole tube.

Further purposes of the invention are to provide a tube welding machine which will be automatic in action; which shall be capable of producing a uniform weld throughout the length of the seam of a tube; which shall be of simple construction; which shall be economical in operation; which may be operated by a person who has little or no skill in the art of welding; and which shall be completely adjustable and adaptable to metallic tubes of various cross-sectional dimensions and shapes.

Still further objects of my invention will appear hereinafter.

My invention comprises a mechanism for holding the seam edges of a metal tube together and for imparting steady longitudinal movement to the tube as a whole, in combination with a relatively stationary means or device for fusing and thus welding the said seam edges while so held and in movement.

Preferably, my invention also comprises means for accurately positioning said seam edges in said holding mechanism and with respect to said welding means.

The invention further consists in various novel constructions and in combinations of parts, all as hereinafter described and particularly pointed out in the appended claims.

Figure 13:
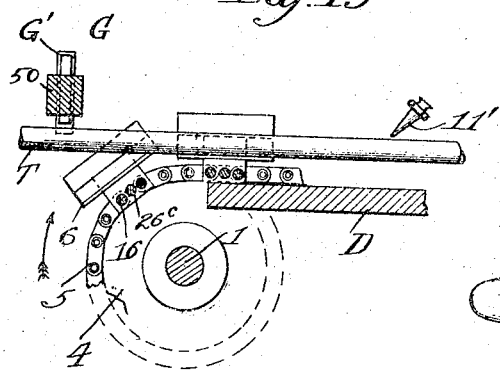
Figure 14:
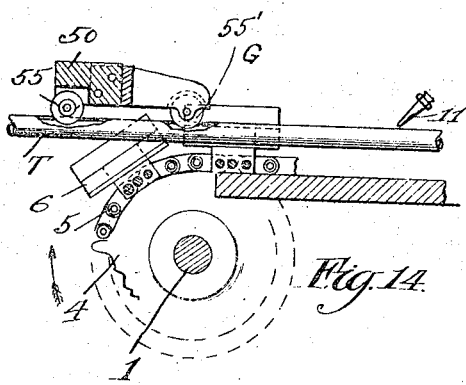
Figure 16:
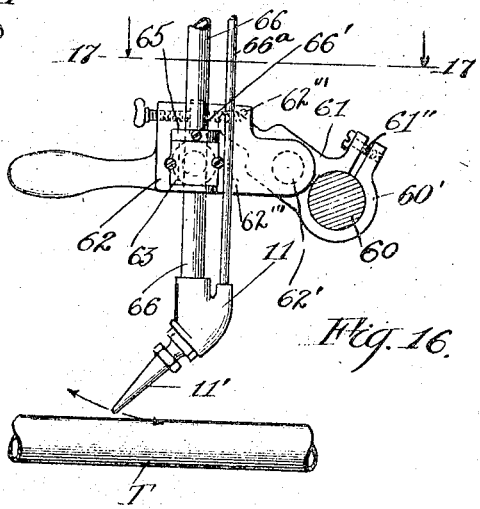
Figure 15:
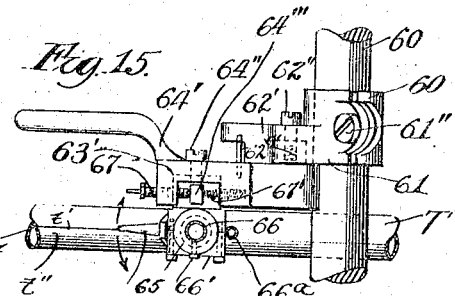
Figure 6:
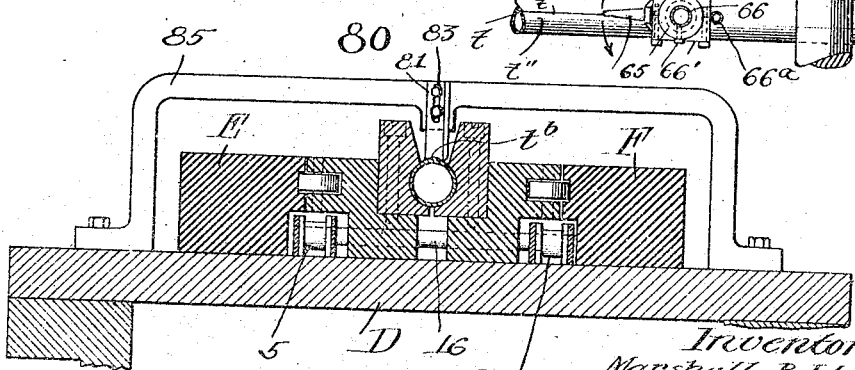

My invention will be more readily understood by reference to the accompanying drawings, illustrating a preferred embodiment thereof, and in which;

Figure 1 is a side elevation of my novel welding machine. The tube holding and moving mechanism of this machine comprises an endless traveling vise of novel form. The welding means comprises a welding torch such as an oxy-acetylene gas torch, positioned and operable in a novel manner to direct a welding flame upon the seam edges of the tube. The seam positioning means here comprises a fixed blade or member which enters the open seam of the tube and co-acts with the receiving end or tube guide of the machine to direct the tube into the traveling vise in such manner that when grasped thereby the tube will present a straight seam to the welding flame of the torch. The bur removing means comprises a suitable planer tool or knife rigidly held in alinement with and conforming to the top of the tubing. Fig. 2 is an enlarged plan view of the machine, the welding torch being removed better to disclose other parts of the machine. Fig. 3 is a vertical transverse section substantially on the line 3—3 of Figs. 1 and 2; Fig. 4 is an enlarged detail plan view of the rear portion of the machine illustrating the spreader or positive means for opening the vise. Fig. 5 is a transverse section substantially on the line 5—5 of Fig. 2, showing the end of a tube about to be grasped by the vise jaws. Fig. 6 is a sectional detail substantially on the line 6—6 of Fig. 2, showing the tube clamped between the jaws, as when moving forward with the vise jaws. Fig. 6ᵃ is a transverse section substantially on the line 5ᵃ—5ᵃ of Figs. 1 and 2, showing the tube after it is welded, and illustrating the bur removing means. Fig. 7 is a detail section substantially on line 7—7 of Fig. 2 showing the operation of the vise jaw spreader or opener. Fig. 8 is a perspective view of the spreader. Fig. 9 is a detail view on line 9—9 of Fig. 1, showing the means for adjusting the tube positioning device. Fig. 10 is a sectional detail view substantially on the line 10—10 of Fig. 9. Fig. 11 is a transverse view partially in section showing details of the traveling conveyer or vise. Fig. 12 is a detail view substantially on the line 12—12 of Fig. 2 showing the throw-out idle gear for stopping and starting the machine. Fig. 13 is a central longitudinal vertical section of the forward or receiving end of the machine showing the tube-positioning device. Fig. 14 is a view similar to Fig. 13, but showing a modified tube positioning device; and Figs. 15 and 16 are detail views of the torch and its holder, Fig. 15 being a plan view substantially on the line 17—17 of Fig. 16.

Metallic tubing of the kind herein referred to is usually made by rolling or forming up a long strip of metal. Such tubing is characterized by a longitudinal slit or open seam, the edges being in abutment. The purpose of my invention is to unite these edges uniformly, rapidly and economically without using a preheating oven or furnace. I accomplish this by placing the tube in a holder which exposes the seam of the tube and by moving the holder and the tube longitudinally at a uniform speed. Both the tube and the holder are practically cold. But the flame of the torch is so intense and so narrowed or localized upon the seam that the seam edges are fused and thus caused to run together or weld as fast as the tube moves past the torch. Upon passing the torch much of the heat of the tube is absorbed by the relatively massive cold vise and the surrounding air. Thus a tube which enters the machine in a cold state is quickly welded and then discharged in practically, a cold state. The temperature of the tube as a whole is not materially raised, the application of intense heat being purely temporary as to each point along the seam.

As herein shown, the frame of the machine may comprise a horizontal box or trough B of cast iron suported by legs A at a height convenient for the operator. Bearing standards C, C and C', C', rise from opposite ends of the frame and support a bed plate D. These standards carry bearings for the shafts 1 and 2. Sprockets 4, 4' and 3, 3' are mounted and spaced apart on the shafts 1 and 2, respectively, for purposes which will appear hereinafter. Additional bearing standards 21$^b$, 21$^b$ rise from the sides of the frame and support the main shaft 21 of the machine. The shaft also has an outboard bearing 20$^{b'}$ mounted upon an arm 20$^b$ and is driven at constant speed from the countershaft 20 through the speed reducing worm 22' and wheel 22. The latter shaft is carried in side brackets 20$^a$ and bears a large pulley P which is driven from any suitable source of power, as by means of the belt P'. A train of gears 2', 23 and 23' connects the shafts 2 and 21. The intermediate gear 23' of this train is carried on a hand lever 23'' pivoted on the shaft 21 whereby it may be swung into and out of operation to start and stop the machine at will. At the forward end of the frame is an upstanding arm 51'''' which supports a guide 51''. This guide supports the tube T and directs it into the machine. The vise or traveling tube holder is substantially horizontally disposed in the frame and is alined with the tube guide 51'' to receive the tubes as they are fed to the machine. The sprockets 3, 3' and 4, 4' heretofore mentioned, carry endless elongated chains 5' and 5 composed of links. Corresponding links of these chains are connected by parallel rods 16, two such rods being provided for each pair of links. These chains travel in unison at constant speed in the manner of an endless belt. Rows or series of gripping jaws 26, 26' are mounted and laterally movable upon the connecting rods 16. Opposed jaws are arranged in pairs and the ends of one pair of jaws practically meet or abut the ends of the next adjacent pair when they are in a straight line so that those jaws which at any instant constitute the straight working portion or stretch of the vise, form in effect two continuous elongated gripping members or bars. These accommodate a considerable length of tube, and yet because divided into a plurality of sections, these practically continuous gripping members may travel constantly in one direction. The gripping faces 6$^t$ are preferably formed in separate blocks or pieces, 6—6', as clearly shown in Figs. 5 and 6, to the end that the blocks may be readily removed and replaced by others conforming to tubes of different cross sectional shape.

It will be observed that the jaws grasp the greater circumferential portion of the tube, exposing preferably only small portions of the upper side thereof. The jaws are normally held open by a pin 26$^c$ which is interposed between the jaws of each pair and against which opposed springs 26$^d$, mounted in openings 26$^a$ in each block act, as is best shown in Figs. 5 and 11. They are spread apart, to clear the tube at the forward end of the mechanism, as they rise into alinement with the tube. On the bed plate D, along the upper side or reach of which this mechanism travels, are two parellel guide or cam bars E and F between which the vise jaws travel and by which they are closed and maintained for a time in clamping engagement with the tube. The forward or receiving ends $e$ and $f$ of these cam bars are curved or flared to receive and slowly close the pairs of jaws in succession as they rise into alinement with the tube, and the rear ends of these cam bars are likewise flared, but more abruptly, so that the jaws will quickly open and release the tube. To insure the positive opening of these jaws, a wedge or spreader 40 is secured to the bed plate D at this place; the point of the spreader being positioned between the rows of jaws. The cam bar F is clamped upon the bed plate by a number of bolts 30. The bolts pass through elongated holes 31 in the bar F, permitting lateral adjustment, whereby the tubing may be subjected to just that degree of lateral pressure needed to hold the seam edges of the tube together and insure a good weld. The lateral thrust on this bar is taken by the horizontal screws 32, which are carried in upstanding lugs 33 on the bed plate D. The cam bar E is similarly arranged on the bed plate D, but the bolts 33′, locked in position by nuts 34′, do not clamp it. Instead they permit it to move laterally. Heavy springs 35 are interposed between the ends of the screws 36 and the edge of the cam bar, thus providing an automatic compensator for the variations due to various causes; such as the expansion of the tube when heated. It will be observed that these parts are all so arranged that the tube holder may be widened or narrowed to adapt the machine to different sizes of tubes.

Each vise section or jaw carries one or more small rollers $6^d$ to reduce the friction incident to the travel thereof upon the cam bars or guides E and F. These rollers are carried in lateral extensions of the jaws and run in grooves in the faces of the cam bars; such engagement prevents the jaws from rising off the bed plate. Beneath the bed plate D is a transverse shaft 45 mounted in slotted bearings 45″, for vertical adjustment. This shaft carries a pair of idler sprockets 45′ which engage the inner side of the lower chain reach. By adjusting set screws 46 the shaft 45 and idler sprockets therewith may be raised and lowered and the tension of the chains thereby regulated.

A pair of standards $60^a$ rise from the sides of the bed plate and support a horizontal rod or shaft 60. The bridge 60 thus formed supports the welding torch above the vise or tube holder, its position being intermediate the ends thereof. The torch which I have shown in the drawings is of the oxyacetylene type. It has two gas supply pipes 66 and $66^a$ which terminate in a gas-mixing chamber 11. This chamber has a finely pointed flame nozzle 11′. The upper ends of the pipes 66 and $66^a$ terminate in a head which carries gas cocks $11^a$ and $11^b$ for proportioning the gases. Supply pipes $11^d$ from the sources of gas supply are connected to this head. The gas nozzle 11′ is inclined downward toward the tube and toward the entrance guide 51″ and plays a flame upon the seam of the tube as it travels forward. The flame which burns at the end of the nozzle may be said to consist of two portions: a fine, narrow, intensely hot portion which fuses the edges $t$, $t$, of the tube and causes them to flow together; and a far-extending corona of lower temperature, which spreads forwardly along the tube. This far-extending or preheating portion of the flame raises the temperature of the metal adjacent the tube seam in advance of the actual welding point and enables a greater welding speed to be obtained. This action is further enhanced by the novel construction of the vise blocks as will be hereinafter explained.

In the machine shown, the torch is relatively stationary with respect to the traveling tube. It is, however, mounted in such manner that it may be accurately positioned. By reference to Figs. 1, 2, 15 and 16 it will be observed that the torch is mounted on a lever 62 which is pivoted at 62′ upon another arm 61. This lever has a handle by which the torch may be quickly swung upwardly clear of the tube, when it is desired to inspect the work. In order, however, that it may be returned instantly to its previous position without readjustment or other manipulation, the free end of the arm 61 engages a stop limit pin 62‴ on the lever 62. For accurate adjustment in a vertical plane, the pipe 66 of the torch is held in a split block 63 rotatably mounted in a socket 63′ in the side of the lever 62. This block has an upstanding lug or projection 64‴ which engages an adjusting screw 67 by which the block is rotated against the opposing action of a spring 67′, also acting against the lug 64‴. By manipulating this screw the torch nozzle may be accurately spaced from the tube seam, and this adjustment will not be destroyed when the torch is swung upwardly and afterward returned to its working position. The split block also permits the torch nozzle to be swung laterally in a horizontal plane, as indicated by the arrows, Fig. 15, for the purpose of alining it exactly with the tube seam. Mounted in the split block 63 is a swivel 65 in which the gas pipe 66 of the torch is clamped by a set screw 66′. The torch can thereby be set and held at desired height. The arm 61 has a split collar 60′ which permits it to be adjusted horizontally along the bridge rod 60 and a screw 61″ fixes it in adjusted position. By means of the parts just described the position of the torch may be adjusted to a nicety, and at the same time the torch may be swung clear of the tube and returned to exactly its previous position.

A constant welding relation should be maintained between the tube seam and the welding flame in order that the weld may be exactly located at the tube seam as the tube travels. Referring to Figs. 1, 2, 9, 10, 13 and 14, it will be seen that a seam positioning blade G' is arranged just in advance of the traveling tube holder. This blade or guide may be mounted in a bridge 50 secured on the forward end of the frame A. It may be removably clamped between two blocks g' and g'' by the eccentric cam g. The blade G' enters the tube seam as the tube feeds into the machine and if the tube seam is in twisted condition the blade, in conjunction with the traveling vise, exerts a twisting or torsional force upon the tube to straighten the seam thereof with respect to the vise and the torch. Thus kinks or irregularities in the tube seam will be automatically corrected and the seam will be presented as a straight line to the welding flame. It is sometimes desirable to use one or more rotary disks in place of the stationary positioning blade G'. Fig. 14 shows a disk 55 mounted on the bridge 50. An additional disk or wheel 55' is mounted on an extension 51 between the disk 55 and the vise. Such disks will wear longer than the fixed blade.

Referring now to Figs. 1, 4, 5 and 6, it will be noted that the jaw sections $6^t$ are provided with extensions or heat localizers $6^x$ which preferably flare slightly on their inner sides and extend outward beyond the tube clamping surfaces of the jaws. The purpose of these extensions $6^x$ is to form a comparatively deep heat retaining groove in the top of the traveling vise. As shown, the nozzle of the torch and the flame thereof enter this groove and it will be obvious that the walls of the groove thus formed serve to direct and confine the heat upon the top and seam edges of the tube, thereby greatly facilitating the welding of the edges.

The pre-formed tubes in a cold condition are started through the guide 51'' into the traveling tube holder; by which they are carried bodily along beneath the welding torch, one tube immediately following the other in continuous series. As each tube is carried along by the moving holder the irregularities in the seam are automatically corrected by the seam positioning mechanism, and the seam is thus presented by the holder in exact alinement with the welding flame. It will be observed that the device grasps the tube for a considerable portion of its length and holds the tube edges in proper welding relation. The torch is positioned above the traveling holder intermediate its ends, and hence the tube is not only firmly held by the holder in advance of the welding point, but it is also held undisturbed after the weld is formed for a sufficient length of time to allow the tube to lose its heat through radiation into the surrounding air and the massive gripping parts of the holder. By the time the tube has emerged from the rear end of the machine it has cooled to a great extent and there is no danger that the weld will open. In order that the vise jaws may be kept cold, they are arranged to travel through the trough (frame) B which is filled with water. If desired, a constant water circulation may be maintained by providing a water inlet b' (Fig. 3) and an overflow pipe b''.

During the welding operation a raised seam or bur $t^b$ usually forms on the top of the tubing. This bur is shown somewhat exaggerated in Fig. $6^a$. It is desirable to remove the bur so that the completed tube will be smooth and uniform. As previously stated the tube is practically cold when it reaches the rear portion of the machine and for that reason I prefer to locate the bur remover at that point. If the bur remover were located where the tube is still hot it would be detrimentally affected by the heat thereof. The bur removing mechanism 80, shown in Figs. 1, 2 and $6^a$, comprises a planer knife or tool 81, positioned in alinement with the tubing. The bottom or working edge of the tool 81 conforms to the top of the tubing. I prefer to arrange the knife or tool at an angle to the horizontal axis of the tubing in order that the cutting efficiency may be increased. To this end it is rigidly bolted to the angled portion 84 of the cross standard 85, by stud bolts 83. The knife is provided with a slot to accommodate the bolts and to permit vertical adjustment. The standard 85 is bolted to the bed plate D, and is bowed upward freely to span the traveling vise jaws. As the tubing travels beneath the sharp edge of the planer tool 81, the latter turns, cuts, or scrapes off the raised seam or bur $t^b$ leaving the top of the tubing in a smooth and finished condition like the other portions of the tube. The seam or weld in the tube after thus finished is practically invisible and the tube has the appearance of and may be considered and treated as a seamless tube.

While I have illustrated my invention as a machine for welding tubes or articles of definite length, it should be understood that my invention is also adapted for interpolation in such continuous (greater length) process as I have disclosed in my pending application Serial Number 638,202 filed July 12, 1911.

It will be obvious that while my machine is particularly adapted for welding tubes, it may be used for welding other articles which present straight or substantially straight seams.

That form of my invention which includes the mechanism depicted in Fig. 14 of the drawings is not specifically claimed in this application but is described and claimed in a divisional application, Serial No. 875,812 filed December 7th, 1914.

Having thus described my invention, I claim as new and desire to secure by Letters Patent:

1. In a tube welder, a moving holder for carrying a tube forward, in combination with a stationary burner arranged to play a flame upon the tube within the confines of said moving holder, and weld the seam thereof as fast as the tube travels, and means for lining up the metal with said burner.

2. In a welding machine a vise for clamping the metal to be welded, in combination with a conveyer for moving said vise past a given point, a burner located at said point and acting to impinge a welding flame upon the seam to be welded.

3. In a welding machine a vise for clamping the metal to be welded, in combination with a conveyer for moving said vise past a given point, a burner located at said point and acting to impinge a welding flame upon the seam to be welded and a guide for properly directing the metal into said vise.

4. A machine for welding or similarly sealing the seam of a metal tube, comprising an automatic traveling holder formed to progressively expose the seam of the tube, and a stationary heating device located over said holder for heating and welding the seam while the tube is so held and moved.

5. A machine for welding or similarly forming a continuous seam, comprising an automatic traveling holder formed to expose the parts of the metal to be welded, a stationary heating device arranged adjacent the holder for heating the exposed metal parts to the proper temperature while the metal is in movement in the holder, and an automatic guide for controlling the relation of the seam and heating device.

6. A machine for welding or similarly forming a continuous seam, comprising an automatic traveling holder formed to expose the parts of the metal to be welded, a relatively stationary heating device for heating the exposed metal parts in the vise to the proper temperature while the metal is in movement, and a positioner co-acting with the metal to be welded to control the relation thereof to said heating device.

7. In a welding machine a moving vise for automatically gripping successive portions of the incoming metal and exposing the seam thereof, in combination with a stationary heater positioned above said vise for applying welding heat to said exposed seam, and a metal positioning mechanism arranged in front of said vise and acting to aline the seam in said vise.

8. A tube welding machine comprising a moving conveyer adapted to propel the tube forward, in combination with means for directing the tube into said conveyer with the seam uppermost, and a burner positioned above said conveyer and adapted to play a flame upon said seam.

9. In a welding machine, a vise for clamping the metal to be welded, in combination with a conveyer for moving said vise past a given point, a burner located at said point and acting to impinge a welding flame upon the seam to be welded and means for smoothing the roughened or raised seam caused by the welding flame.

10. A tube welder comprising an elongated moving conveyer for propelling the tube longitudinally forward and having vise mechanism formed for compressively gripping the tube, in combination with means for positioning the tube with the seam uppermost, and a relatively stationary burner arranged above said conveyer and projecting a welding flame upon said seam.

11. A welding machine comprising a moving vise for automatically propelling the metal forwardly at a constant speed and exposing the seam thereof, in combination with a stationary burner arranged above said vise for applying heat to said exposed parts in said vise, and said vise having heat localizers for confining the heat upon said seam.

12. A welding machine comprising a traveling vise for automatically gripping and conveying the metal forward and exposing the seam uppermost, in combination with a burner arranged above said vise for welding said exposed parts in the vise, as the metal travels, and means for cooling said vise.

13. A welding machine for welding the seam of metallic tubing comprising a combined conveyer and vise for successively engaging unwelded portions of the incoming tube, and drawing said tube along with its seam exposed and at a constant speed, in combination with a burner arranged in position adjacent and over said mechanism and adapted to continually play a welding flame upon the exposed seam of the tube while the tube is moving.

14. A machine for welding the seam of metal tubing comprising a combined traveling conveyer vise adapted to impart automatically and constantly a longitudinal movement to said tube, a burner arranged adjacent and over said conveyer and adapted to play a flame continually upon the seam of the tube while the tube is moving, in combination with a bur removing tool adapted to remove the raised seam or bur caused by the welding flame.

15. A machine for welding the seam of metal tubing comprising a combined traveling conveyer vise adapted to automatically and constantly impart a longitudinal movement to said tube, in combination with a burner arranged adjacent said conveyer and arranged to play a flame upon the seam of the tube in the vise continually while the tube is moving, and a tube positioner adapted to maintain the seam in alinement with the flame.

16. In a machine for welding the seam of metal tubing, a constantly moving mechanism arranged to grip the tube automatically to convey the tube forward continually with the seam uppermost, in combination with a relatively stationary burner arranged above said conveyer and intermediate the ends thereof, said burner being adapted to play a welding flame upon the seam of the tube as the tube moves beneath it, and mechanism operable after the weld is formed for releasing the tube.

17. A tube welder comprising an endless conveyer adapted to receive tubes at one end of the working stretch and discharge them at the other, in combination with a burner arranged intermediate the ends of said conveyer in position to weld the seams of the tubes as they are moved beneath it by said conveyer, and pressure mechanism for automatically causing a welding pressure at the tube seams.

18. A tube welder comprising a traveling vise mechanism for constantly imparting longitudinal movement to and simultaneously exerting pressure upon and exposing the seam of the tube, a welding torch in juxtaposition to the vise mechanism to weld the seam while under pressure therein, means for determining the position of the tube seam in the vise and pressure relieving mechanism operable after the weld is completed.

19. A machine for welding the seam of metal tubing comprising a combined traveling conveyer vise adapted automatically and constantly to impart a longitudinal movement to said tube, in combination with a burner arranged adjacent said conveyer and adapted to play a flame continually upon the seam of the tube in the traveling conveyer while it is moving, a tube positioner adapted to maintain the seam in alinement with the flame and means operable after the weld is formed for smoothing the raised seam or removing the bur resulting from the welding operation.

20. In a welding machine a constantly moving conveyer having a plurality of clamping jaws adapted to act successively to clamp the metal to be welded and maintain it under welding pressure, and also provided with heat localizers or extensions for confining the heat to the seam edges, a heater adapted to impinge a heating flame upon the metal while under pressure, and means for cooling the jaws of said conveyer.

21. A tube welding machine comprising a substantially horizontal conveyer having a plurality of clamps arranged in pairs, a channel arranged adjacent the upper side of said conveyer, the walls whereof cause successive pairs of clamps to grip the tube as it travels, a burner arranged above said conveyer in position to weld the seam of the tube while under pressure, and means for positively opening said clamps after the welding operation.

22. A tube welding machine comprising a substantially horizontal traveling vise having a plurality of clamps arranged in pairs, and adapted to receive the tube to be welded, a channel adjacent the upper side of said vise and having cam walls which cause successive pairs of clamps to grip the tube and propel it forward, a welder arranged above said vise in position to weld the seam of the tube as it travels, means for positively opening said clamps subsequent to the welding operation, and a cooling trough arranged below said vise, substantially as described.

23. A tube welder comprising traveling vise mechanism for constantly imparting longitudinal movement to the tube and simultaneously exerting pressure upon and exposing the seam of the tube, a welding torch in juxtaposition to the vise mechanism to weld the seam while under pressure therein, means for determining the position of the seam in the vise, bur removing means arranged to operate after the formation of the weld for smoothing and finishing the weld, and pressure relieving mechanism operable after the bur has been removed.

24. A tube welding machine comprising a substantially horizontal conveyer, a plurality of laterally movable jaws arranged in pairs thereon, mechanism for closing pairs of jaws successively upon the tube to be welded thereby causing forward travel of said tube, a welding burner adapted to heat the tube while moving, and a spreader for positively opening the pairs of jaws successively to release the tube after it is welded.

25. In a tube welding machine, a traveling vise for holding and propelling a tube longitudinally forward, an adjustable welding burner adapted to impinge a welding flame upon the seam of the tube in said vise, in combination with a bur removing tool positioned to operate on the tube after the welding thereof to remove the bur occasioned by the welding operation.

26. The improvements herein described comprising an endless single direction traveling vise having pairs of vise jaws so arranged that a plurality of pairs are adapted simultaneously to grip a tube or the like and to expose the seam thereof, means for applying welding heat to the tube so held and means for confining or localizing the heat to the portion of the tube adjacent the seam, and a bur removing knife or tool positioned to operate after the formation of the weld and while the tube is clamped between the traveling vise.

27. A tube welding machine comprising a substantially horizontal traveling conveyer, a plurality of laterally movable jaws arranged in pairs thereon, mechanism for automatically closing the pairs of jaws successively upon the tube to be welded, a heating device coöperating therewith to weld the tube while in said jaws and a spreader for positively opening the pairs of jaws successively.

28. In a tube welder, a relatively stationary burner, in combination with a constantly traveling tube carrier for progressively compressing and presenting the unwelded seam of a tube to the burner, and a pressure relieving device operable to relieve the tube of the compressive action of said tube carrier after the seam of the tube is welded.

29. In a welding machine, a continuously traveling conveyer for propelling a metal tube forward at a constant speed, in combination with a stationary flame burner arranged above said conveyer and adapted to project a concentrated flame downwardly upon the seam of the tube and progressively to weld said seam as the tube moves, said continuously traveling conveyer being formed and adapted automatically to clamp successive portions of the tubing and to hold the edges thereof in welding relation while passing the burner, automatic opening mechanism at the rear of said conveyer, and a tube positioning device co-acting with the receiving end of the conveyer.

30. In an automatic tubewelder, a combined tube carrier and vise for constantly acting to grip successive portions of a tube and automatically applying pressure thereto to hold the edges of the tube seam in butt relation, in combination with a welding burner above said tube-carrier adapted to play a flame upon the seam of the tube in the vise as it travels, and a tube positioning device coöperating with the unwelded seam of the tube to present said seam in proper alinement with the burner.

31. In an automatic tube welder, a combined tube carrier and vise for constantly acting to grip successive portions of a tube and automatically applying pressure thereto to hold the edges of the tube seam in butt relation, in combination with a welding burner above said tube-carrier adapted to play a flame upon the seam of the tube as it travels, a tube positioning device coöperating with the unwelded seam of the tube to present said seam in proper alinement to the burner, and an automatic device for opening said vise as the tube leaves the combined tube carrier and vise.

32. In a welding machine, a combined tube carrier and pressure vise for successively acting to grip unwelded portions of an incoming tube and close the edges of the tube seam together, in combination with a stationary burner above said tube carrier, and acting to impinge a flame upon the closed seam of the tube in the vise to weld said seam as the tube passes, a tube-guide for presenting said seam in proper alinement with the burner, heat localizing means for confining the heat of the flame to the tube, and means for cooling said carrier and vise.

33. A tube welder comprising a constantly-moving tube carrier having a plurality of vise jaws secured to a common member for automatically operating compressively to clamp successive portions of the tube to propel said tube longitudinally forward, a device for positioning the tube as it enters the carrier, and a stationary heater near the middle of the carrier adapted to direct a flame upon the seam of the tube and weld said seam as it passes.

34. In a welding machine comprising an automatic traveling holder operable successively to clamp a tube and expose the seam thereof, and continuously to carry said tube forward, a torch located over said traveling holder to direct a welding flame on the seam of the tube as it is carried forward by said traveling holder and a knife contacting the upper exposed portion of the tube and operating to remove the raised seam of bur occasioned during the welding operation.

35. A tube welder comprising a constantly-moving tube carrier having a plurality of vise jaws for automatically operating compressively to clamp successive portions of the tube to propel said tube longitudinally forward, a device for positioning the tube as it enters the carrier, a stationary heater adapted to direct a flame upon the seam of the tube and weld said seam as it passes, and means for adjusting said carrier and vise to adapt it to different shapes and sizes of tubes.

36. In a tube welder, a constantly-moving tube carrier, comprising a plurality of laterally movable vise jaws for automatically operating compressively to grip successive incoming portions of the unwelded tube and move the tube at a constant rate of speed, a device for controlling the position of the tube seam, a stationary heater adapted to direct a welding flame locally upon the tube seam, and means for adjusting said carrier to adapt it to different sizes and shapes of tubes.

37. In a tube welding machine, an elongated constantly-traveling tube-carrier having a plurality of laterally movable clamping members arranged in pairs and adapted to act to successively clamp the incoming tube, in combination with a relatively fixed welding device above said tube carrier, and an automatic opener near the rear end of said carrier for spreading the clamping members to release the tube.

38. In a welding machine a constantly-moving sectional work vise, in combination with a closing mechanism for automatically operating to close the sections of said vise and clamp successive portions of the tube fed to the machine, a torch for welding the tube seam while the tube is clamped in said vise, and means for regulating the temperature and position of the welding flame.

39. In a tube welder, mechanism for feeding the unwelded tube with its seam uppermost, in combination with an elongated substantially horizontal traveling vise for continuously receiving and propelling forward the incoming tube, said vise comprising a pair of endless chains having a plurality of movable vise sections arranged in pairs, closing mechanism for automatically closing said pairs of vise sections as they successively move into working position and for maintaining said sections in clamping engagement with the tube while the tube seam is being welded, a burner arranged above said traveling vise for welding the exposed seam as it is carried along by said vise, and a spreader at the end of the vise for automatically operating to open said vise sections successively.

40. In a tube welder, mechanism for feeding the unwelded tube with its seam uppermost, in combination with an elongated substantially horizontal traveling vise for continuously receiving and propelling forward the incoming tube, said vise comprising a pair of endless chains having a plurality of movable vise sections arranged in pairs, closing mechanism for automatically closing said pairs of vise sections as they successively move into working position and for maintaining said sections in clamping engagement with the tube while the tube seam is being welded, a burner arranged above said traveling vise for welding the exposed seam as it is carried along by said vise, a knife in alinement with the tube and positioned to remove the raised seam or bur caused by the welding operation, and a spreader at the end of the vise for automatically operating to open said vise sections successively.

41. In a tube welder an endless, elongated conveyer mechanism adapted constantly to travel in one direction and having a plurality of pairs of laterally movable and pivotally mounted vise jaws, in combination with adjustable side members co-acting with said jaws to successively close and clamp them upon the incoming tube and hold said jaws closed while the welding operation is being performed, a burner mounted adjacent the upper side of said mechanism for directing a flame upon the seam of the tube, and an entering wedge positioned at the rear end of said mechanism for positively forcing the jaws apart.

42. In a tube welding machine, a traveling vise for holding and moving a tube longitudinally forward with its seam edges exposed, in combination with a welder which is stationary with respect to said vise and which is adapted to operate upon the seam of the tube therein, and a holder in which said welder is frictionally held which permits the accurate adjustment thereof with respect to the vise and said seam edges.

43. In a tube welder, mechanism for moving the tube in a longitudinal direction, in combination with a welding torch adapted to impinge a flame upon the tube as it travels and progressively weld the seam, and heat localizers connected to the mechanism for moving the tube arranged to confine the heat to the portions of the tube to be welded.

44. The improvements herein described, comprising an endless single direction traveling vise having pairs of vise jaws so arranged that a plurality of pairs are adapted to simultaneously clamp a tube or the like and expose the seam thereof, and means for applying a welding heat to the tube so held locally at one point in the travel of said jaws.

45. The improvements herein described comprising a traveling sectional vise formed and operative after the manner of an endless belt and in its active portion presenting the substantial equivalent of two elongated metal bars adapted to longitudinally clamp the article to be welded and expose the seam thereof, in combination with means for creating a constant stationary heating zone between and intermediate the ends of the said active portion of the vise.

46. In a welding machine, the combination of a traveling vise for holding and propelling a tube longitudinally forward, with the seam exposed, a welding burner located to impinge a flame upon the seam and weld the tube, and a vertically adjustable planer knife in alinement with the tube and positioned to remove the raised seam or bur, resulting from the welding operation.

47. In a welding machine, the combination of a vise for clamping the tube to be welded, and exposing the seam thereof, a conveyer for moving said vise past a given point, a burner located at said point and acting to impinge a flame upon the tube adjacent the seam to weld same, a planer knife arranged with the cutting edge at an angle to the longitudinal axis of the tube and operating to remove the raised or roughened seam resulting from the welding operation.

48. In a tube welding machine, a moving vise for automatically gripping successive portions of an incoming tube and exposing the seam thereof, in combination with a stationary heater positioned above said vise for applying welding heat to the exposed seam, and a stationary blade arranged in front of said moving vise, positioned to enter the seam of the tube, and acting to aline the seam in said vise, as and for the purpose specified.

In testimony whereof, I have hereunto set my hand, this 11th day of March, 1912, in the presence of two subscribing witnesses.

MARSHALL BURNS LLOYD.

Witnesses:
HILDA C. PETERSON,
CHARLES GILBERT HAWLEY.